United States Patent
Eyraud et al.

(10) Patent No.: US 6,691,848 B1
(45) Date of Patent: Feb. 17, 2004

(54) ONE-WAY CLUTCH

(75) Inventors: Emmanuel Jacques Eyraud, Nieuwegein (NL); Hendrikus Jan Kapaan, Nieuwegein (NL); Marc Michel Le Calve, Cerelles (FR)

(73) Assignee: SKF Engineering & Research Centre B.V., Nieuwegein (NL)

( * ) Notice: Subject to any disclaimer, the term of this patent is extended or adjusted under 35 U.S.C. 154(b) by 0 days.

(21) Appl. No.: 10/110,969
(22) PCT Filed: Nov. 1, 2000
(86) PCT No.: PCT/NL00/00789
§ 371 (c)(1), (2), (4) Date: Apr. 18, 2002
(87) PCT Pub. No.: WO01/33092
PCT Pub. Date: May 10, 2001

(30) Foreign Application Priority Data

Nov. 1, 1999 (NL) .............................................. 1013449

(51) Int. Cl.[7] .............................................. F16D 41/18
(52) U.S. Cl. ..................... 192/46; 192/112; 192/113.32
(58) Field of Search ............................. 192/46, 113.32, 192/112, 113.1, 115

(56) References Cited

U.S. PATENT DOCUMENTS

| | | | | |
|---|---|---|---|---|
| 1,452,316 A | | 4/1923 | Shirley | |
| 1,955,200 A | * | 4/1934 | Millican | 192/46 |
| 2,010,528 A | | 8/1935 | Schofield et al. | |
| 2,014,383 A | | 9/1935 | Knox et al. | |
| 3,918,776 A | | 11/1975 | Zimmer et al. | |
| 4,254,852 A | * | 3/1981 | Orozco | 192/46 |
| 4,453,729 A | * | 6/1984 | Lucken | 280/250.1 |
| 5,449,057 A | * | 9/1995 | Frank | 192/46 |
| 5,573,094 A | * | 11/1996 | Roberts | 192/45 |
| 5,853,073 A | * | 12/1998 | Costin | 192/46 |

FOREIGN PATENT DOCUMENTS

| | | |
|---|---|---|
| CN | 1 178 873 A | 4/1998 |
| DE | 68 00 671 U | 1/1969 |
| EP | 0 432 393 A1 | 6/1991 |
| WO | WO 99/47828 | 9/1999 |

* cited by examiner

Primary Examiner—Saul Rodriguez
(74) Attorney, Agent, or Firm—Oliff & Berridge, PLC

(57) ABSTRACT

A one-way clutch including at least two concentric rings one of the rings carrying at least one ratchet pawl, and the other of the rings including ratchet teeth which engage the at least one ratchet pawl so as to allow relative rotational movement of the at least two rings in one rotational direction, and to provide a clutch between those rings in the operate rotational direction. At least one of the rings includes two identical half rings which are connected to each other and which at least partly enclose the other rings at axially opposite ends.

13 Claims, 2 Drawing Sheets

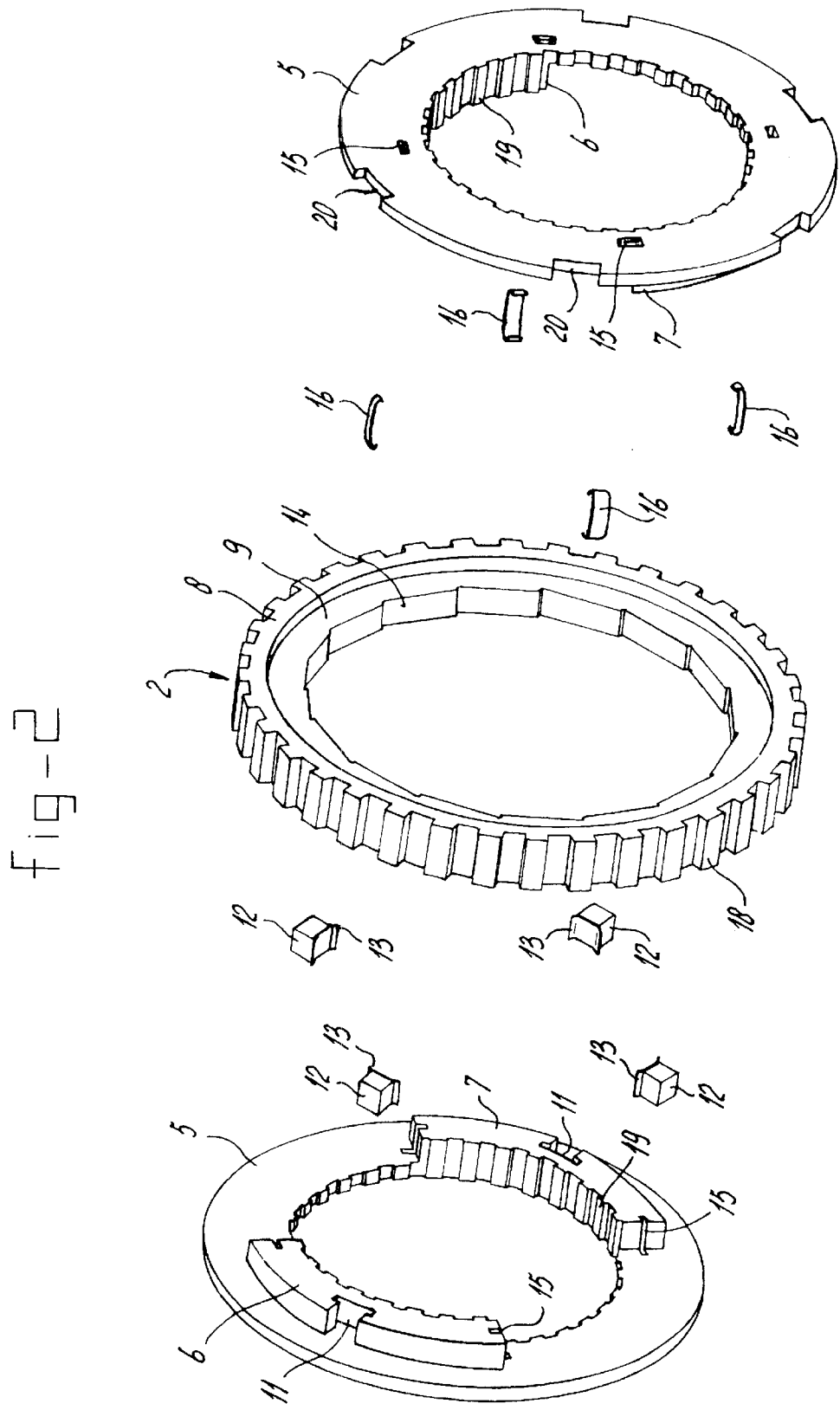

ONE-WAY CLUTCH

The invention is related to a one-way clutch, comprising at least two concentric ring means, one of said ring means carrying at least one ratchet pawl, and the other of said ring means comprising ratchet teeth which engage said at least one ratchet pawl so as to allow relative rotational movement of said at least two ring means in one rotational direction, and to provide a clutch between those ring means in the opposite rotational direction.

Such one-way clutches are generally known, and are e.g. applied in the automotive field, in particular in automatic transmissions.

The object of the invention is to provide a one-way clutch having a construction which is improved with respect to stiffness, ease of manufacture and durability. This object is achieved in that at least one of said ring means comprises two identical ring halves which are connected to each other and which at least partly enclose the other ring means at axially opposite ends.

The ring means which comprises two identical ring halves, is relatively easy and cheap with respect to manufacturing. Moreover, it is possible to provide a sturdy, self-contained unit due to the fact that the other ring means can be enclosed, and therefore be held captive, between the two rings.

Preferably, the identical ring halves constitute an inner ring means, each ring half being provided with a radially outwardly extending flange and axially extending sleeve means, said sleeve means fitting together so as to provide a full sleeve.

The axially extending sleeve means of both ring halves are intermitted in such a way, that a full sleeve is obtained. Preferably, the sleeve means of each ring half comprises at least one axially extending sleeve part which stretches over less than the full circumference of said ring half, said sleeve parts of said ring halves being complementary.

According to the most preferred embodiment, each sleeve means of each ring half comprises two sleeve parts, which are regularly spaced in circumferential direction.

The ratchet mechanism which provides a fixed coupling between the ring means in one rotational direction, and which allows relative rotations in the other direction, can be carried out in several ways. According to a first possibility, at least one sleeve part is provided with a radially outwardly extending slot, which accommodates a spring-biassed ratchet pawl.

In this embodiment, the ratchet pawl is freely translatably in radial direction, a blade spring being provided at its radially inner end for constantly urging the ratchet pawl in radially outward direction.

According to an alternative embodiment, a ratchet pawl may be provided which is pivotable.

The outer ring means may comprise an axially extending outer sleeve which surrounds the flanges of both rings of the inner ring means, and radially inwardly protruding ratchet teeth accommodated between said flanges.

According to a further embodiment, one of the ring means may comprise at least one ratchet pawl which is movable in axial direction, and the other ring means may comprise ratchet teeth on a radially extending surface of said other ring means.

The ring halves of the inner ring means may be provided with mutually aligned, axially extending slots accommodating a spring clip for mutually connecting said rings.

The invention will be described further with reference to an embodiment of the one-way clutch as shown in the figures.

FIG. 2 shows an exploded view.

Figure 1:
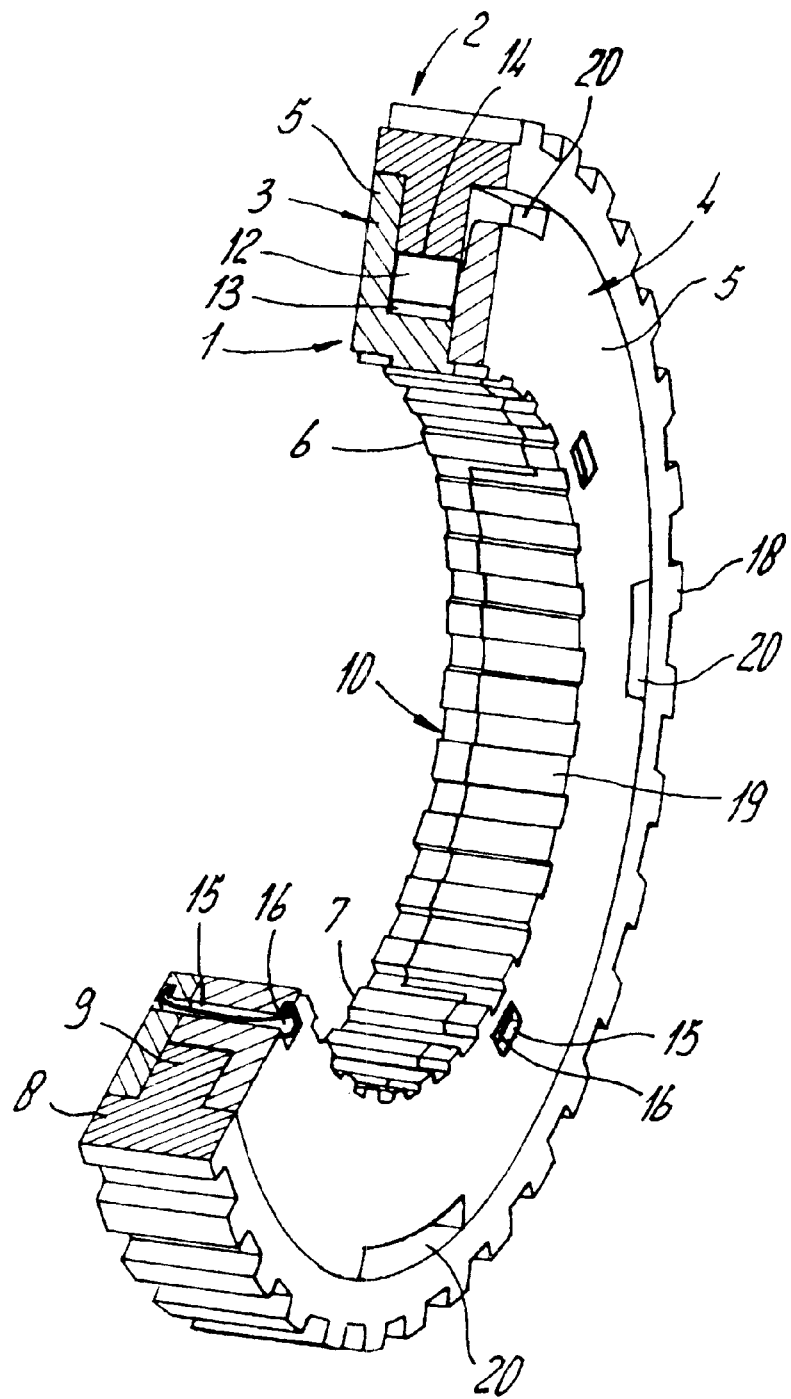
FIG. 1 shows a view in perspective of a part of the one-way clutch according to the invention.

The one-way clutch as shown in FIGS. 1 and 2 comprises an inner ring means 1 and an outer ring means 2. The inner ring means 1 comprises two identical ring halves 3, 4, each being provided with a radially outwardly extending flange 5 and two axially extending sleeve parts 6, 7.

The outer ring means comprises an axially extending outer sleeve 8, as well as a radially inwardly extending flange 9.

As shown in FIG. 1, the inner ring halves 3, 4 are assembled in such a way that the sleeve parts 6, 7 thereof constitute a full inner sleeve 10. The ring halves are mutually connected by mans of clips 16, inserted in openings 15.

As shown in FIGS. 1 and 2, the inner sleeve 10 comprises radially extending slots 11, accommodating radially translatable ratchet pawls 12, which are biassed by blade springs 13.

The inwardly protruding flange 9 of the outer ring means 2 comprises ratchet teeth 14, which engage the ratchet pawls 12. As a result of the co-operation of ratchet pawls 12 and ratchet teeth 14, the inner ring means 1 and outer ring means 2 move in unison in one direction, whereas relative rotation movement are possible in the opposite direction, the ratchet pawls 12 than ratching over the ratchet teeth 14.

The inwardly protruding sleeve 9 of the outer ring means 2 is accommodated between the flanges 5 of the ring halves 3, 4.

The ring means 1, 2 are provided with splines 18, 19 for connecting them to e.g. a shaft.

The ring means 1, 2 may be formed either of a metal or a non-metal. In particular powder forming may be applied.

At least one of the ring means 1, 2 is provided with surface grooves 20 for supplying oil to the ratchet teeth 14 and/or ratchet pawl(s) 12.

The ring means 1, 2 may be lubricated and sealed for life.

What is claimed is:

1. One-way clutch, comprising:
   at least two concentric rings, one of said rings carrying at least one spring biased ratchet pawl, and the other of said rings including ratchet teeth which engage said at least one ratchet pawl so as to allow relative rotational movement of said at least two rings in one rotational direction, and to provide a clutch between those rings in the opposite rotational direction, wherein at least one of said rings includes two identical ring halves which are connected to each other and which at least partly enclose the other ring at axially opposite ends, and at least one sleeve part is provided with a radially outwardly extending slot which accommodates the ratchet pawl wherein the identical rings halves constitute an inner ring, each ring half being provided with a radially outwardly extending flange and said sleeve part, said sleeve parts extending axially, and fitting together so as to provide a full inner sleeve, the other ring forming an outer ring.

2. Clutch according to claim 1, wherein the rings are mutually sealed by a labyrinth seal.

3. Clutch according to claim 1, wherein the axially extending sleeve parts stretch over less than the full circumference of said ring half said sleeve parts of said rings' halves being complementary.

4. Clutch according to claim 3, wherein each sleeve part of each ring half further comprises two sleeve parts which are regularly spaced in a circumferential direction.

5. Clutch according to claim 3, wherein at least one sleeve part is provided with a radially outwardly extending slot which accommodates said spring biased ratchet pawl.

6. Clutch according to claim 4, wherein the ratchet pawl is freely translatably in radial direction, a (blade) spring being provided at its radially inner end for constantly urging the ratchet pawl in radially outward direction.

7. Clutch according to claim 3, wherein the outer ring further comprises an axially extending outer sleeve which surrounds the flanges of both ring halves and radially inwardly protruding ratchet teeth accommodated between said flanges.

8. Clutch according to claim 1, wherein one of the rings comprises at least one ratchet pawl which is movable in an axial direction, and the other ring comprises ratchet teeth on a radially extending surface of said other ring.

9. Clutch according to claim 1, wherein the ring halves are provided with mutually aligned, axially extending slots accommodating a spring clip for mutually connecting said ring halves.

10. Clutch according to claim 3, wherein the outer ring comprises drive means.

11. Clutch according claim 3, wherein the inner ring comprises drive means.

12. Clutch according to claim 1, wherein at least one of the rings is formed of powder material.

13. Clutch according to claim 1, wherein at least one of the rings is provided with surface grooves for supplying oil.

* * * * *